(12) United States Patent
Kapila et al.

(10) Patent No.: US 12,278,659 B2
(45) Date of Patent: Apr. 15, 2025

(54) SWITCHABLE ANTENNA SYSTEM

(71) Applicant: Intel Corporation, Santa Clara, CA (US)

(72) Inventors: Smit Kapila, Karnataka (IN);
Jayprakash Thakur, Karnataka (IN);
Santosh Gangal, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 789 days.

(21) Appl. No.: 17/348,803

(22) Filed: Jun. 16, 2021

(65) Prior Publication Data

US 2022/0407557 A1 Dec. 22, 2022

(51) Int. Cl.
*H04B 1/44* (2006.01)
*H04B 1/401* (2015.01)

(52) U.S. Cl.
CPC ................................ *H04B 1/401* (2013.01)

(58) Field of Classification Search
CPC ........ H04B 1/401; H04B 1/0064; H04B 1/02; H01R 4/00; H01R 9/00
See application file for complete search history.

(56) References Cited

U.S. PATENT DOCUMENTS

| | | | |
|---|---|---|---|
| 10,181,686 B1* | 1/2019 | Patel | H01R 13/70 |
| 11,438,082 B2* | 9/2022 | Choi | G06F 1/1626 |
| 2007/0281604 A1* | 12/2007 | Morris | H04B 7/18517 |
| | | | 455/11.1 |
| 2012/0008668 A1* | 1/2012 | Sodersjerna | H05K 1/0268 |
| | | | 375/222 |
| 2015/0346794 A1* | 12/2015 | Sakashita | G06F 1/3287 |
| | | | 713/310 |

* cited by examiner

*Primary Examiner* — Tuan Pham
(74) *Attorney, Agent, or Firm* — Viering, Jentschura & Partner mbB

(57) ABSTRACT

A wireless computing device may include an internal antenna, a radio frequency (RF) transmission path that is switchably connectable to the internal antenna, a Universal Serial Bus (USB) connector configured to connect to an external antenna, a detector configured to detect if an external antenna is connected to the USB connector, and an antenna selector configured to (1) connect the internal antenna into the RF transmission path if the detector detects that no external antenna is connected to the USB connector and (2) disconnect the internal antenna from the RF transmission path and connect the external antenna into the RF transmission path if the detector detects that the external antenna is connected to the USB connector, thereby improving the wireless transmission/reception performance of the internal wireless module of the wireless computing device.

18 Claims, 2 Drawing Sheets

SWITCHABLE ANTENNA SYSTEM

TECHNICAL FIELD

Various aspects relate generally to components, systems, and methods for selecting and using an external antenna over a Universal Serial Bus (USB) connector.

BACKGROUND

Computing devices that include wireless networking components use antennas to transmit and/or receive radio frequency (RF) communication signals. The compact form factors of today's wireless computing devices, however, mean that an internal antenna may not always provide optimal wireless transmission/reception performance. In addition, many of today's wireless computing devices have the ability to change the screen angle, rotate the device, or convert the screen/keyboard arrangement from a traditional laptop mode into a tablet mode. As a result, the internal antenna's performance may differ for each potential usage mode (i.e., as the screen angle/orientation changes or if usage of the device changes from laptop mode to tablet mode). As many computing devices also support connected modern standby (CMS), the computing device's wireless interface must remain active even when the computer's lid is closed. In this mode, however, the internal antenna performance is often severely degraded.

BRIEF DESCRIPTION OF THE DRAWINGS

Throughout the drawings, like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

The following detailed description refers to the accompanying drawings that show, by way of illustration, specific details and aspects in which the disclosure may be practiced. One or more aspects are described in sufficient detail to enable those skilled in the art to practice the disclosure. Other aspects may be utilized and structural, logical, and electrical changes may be made without departing from the scope of the disclosure. The various aspects described herein are not necessarily mutually exclusive, as some aspects can be combined with one or more other aspects to form new aspects. Various aspects are described in connection with methods and various aspects are described in connection with devices and vice versa. However, it may be understood that aspects described in connection with methods may similarly apply to the devices, and vice versa. Throughout the drawings, it should be noted that like reference numbers are used to depict the same or similar elements, features, and structures.

As discussed in more detail below, the present disclosure provides for a system that allows a wireless computing device to connect to an external passive antenna via an existing USB connector. The disclosed approach is advantageous in that it at least allows the wireless computing device to use an external antenna over a USB connector without having to set-up a USB interface for USB communications with the external antenna device. This solution improves wireless transmission/reception performance by using a passive external antenna over a USB connector.

Figure 1:
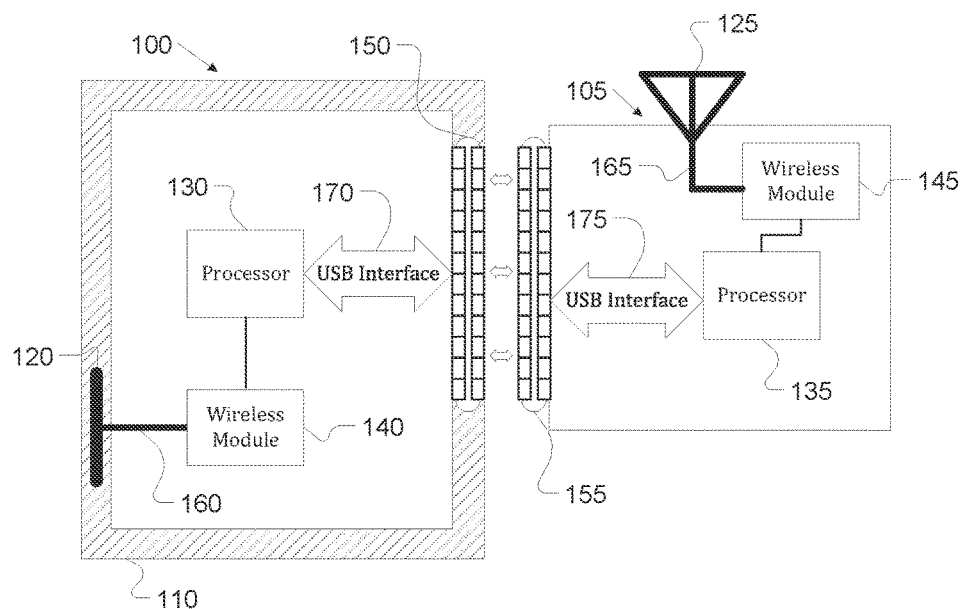
FIG. 1 shows an exemplary prior art wireless computing device with an external USB antenna device.

FIG. 1 illustrates an exemplary wireless computing device 100 that contains a processor 130, wireless module 140, and internal antenna 120. The wireless module 140 transmits and receives radio frequency (RF) communication signals via an RF transmission path 160 that includes internal antenna 120. The wireless computing device may take any number of forms, including but not limited to a computer, laptop, or smartphone. As is typical of today's mobile computing devices, they often contain a number of features supported by various electronic components, connectors, screens, cameras, and other hardware that are enclosed with its housing (e.g., chassis 110). Given the number of internal components compared to the small form factor, the internal components must be relatively small and use only a relatively small amount of the available space within the chassis. As a result, wireless modules within such computing devices typically utilize internal antennas (e.g., antenna 120) that are limited by the size and shape of the respective chassis (e.g., chassis 110). In addition, the internal antenna's performance may differ for each potential usage mode (e.g., as the screen angle changes or if usage of the device changes from laptop mode to tablet mode, from an open lid mode to a closed lid connected modern standby mode, or from a portrait orientation to a landscape orientation). As a result, it may be desirable to connect an external antenna to the wireless computing device in order to achieve improved antenna performance, for example, that is optimized for the current usage mode.

To facilitate connections to external accessories, wireless computing devices typically include a number of connectors that allow the device to connect to an external accessory with external components. This allows a wireless computing device to utilize the features of external components that are not contained within the chassis 110. As shown in FIG. 1, for example, wireless computing device 100 includes a Universal Serial Bus (USB) connector 150. The USB connector 150 allows the wireless computing device 100 to connect to external devices (e.g., external antenna device 105) and communicate over a USB interface to use the external accessory (e.g., processor 135, wireless module 145, and external antenna 125). In such a case, the internal wireless module 140 is not utilized, as the external device 105 becomes the primary wireless module for wireless computing device 100.

External device 105, also shown in FIG. 1, is one example of an external device that can connect to wireless computing device 100. External device 105 includes a USB connector 155, a processor 135, and an antenna 125. USB connector 155 of external device 105 is configured to mate with the USB connector 150 of wireless computing device 100 and to establish USB-enabled communication between wireless device 100 and external device 105. In order to establish USB-enabled communication, the wireless computing device 100 and the external device 105 follow a handshaking procedure that is set forth in the USB standard. In such a case, the internal wireless module 140 is not utilized, as the external device 105 becomes the primary wireless module for wireless computing device 100.

Indeed, Universal Serial Bus (USB) connectors are a widely used type of connector and the USB standard is a widely used communications protocol developed by the USB implementors forum (USB-IF). The USB-IF maintains numerous releases of the USB standard, including USB 1.0, USB 2.0, USB 3.x, USB4, and new release continue to be developed. The term "USB standard," unless specific to a particular release (or an amended version of the release), is meant to encompass all past and future releases/versions of the USB standard. When a specific release is referenced, e.g., "USB Revision 3.2," it is meant to encompass all revisions of the specific release as well as earlier compatible releases of the standard (e.g., USB Revision 3.2 would include portions of USB 1.0 and USB 2.0 that are backward compatible in USB 3.2). The term "USB connector," unless specific to a particular physical type, is meant to encompass all past and future USB connector types, including the USB type-C connector (also knows as a USB-C connector). As one example, the USB type-C connector specification is described in *USB Type-C and Connector Specification*, Release 2.0 (August 2019), published by the USB-IF.

Figure 2:
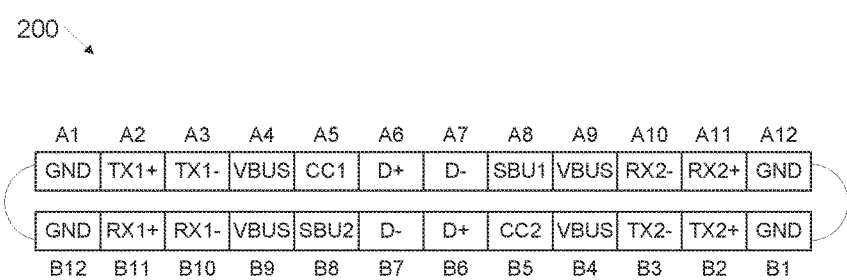
FIG. 2 shows an exemplary prior art USB type-C connector pinout.

One example of a USB connector interface is shown in FIG. 2, which depicts a USB type-C receptacle interface (front view), including pin assignments for each of the signal lines described in the USB standard. FIG. 2 shows the functional signal plan for a full-featured USB type-C receptacle. As detailed in the USB Type-C specification, the receptacle signal list functionally delivers both USB 2.0 (D+ and D−) and either USB 3.2 or USB4 (TX and RX pairs) data buses, USB power (VBUS) and ground (GND), Configuration Channel signals (CC1 and CC2), and two Sideband Use (SBU) signal pins. Consistent with the USB specification and as shown in FIG. 2, USB type-C connector 200 has a top row of pins A1 through A12 and a bottom row of pins B12 through B1 and the signal corresponding to each pin.

In addition to the connector, the USB standard sets forth the required signaling protocols and communication protocols whereby two or more USB standard-compliant devices may exchange information over the various pins/signal lines. One example of the USB standard is USB Revision 3.2, published as *Universal Serial Bus Revision 3.2 Specification* (Sep. 22, 2017) by the USB-IF, and which further describes the signal requirements of the USB interface according to the USB 3.2 standard. In general, communication over a USB interface first involves a handshaking process commonly known as "enumeration," whereby devices obtain or are assigned an identifier and thereafter may communicate data over the USB interface according to the communication protocols set forth in the USB standard. If a device does not follow the enumeration procedure and the communication protocols set forth in the USB standard, the device—even if physically connected to a USB interface via a USB connector—will not be able to communicate data over the USB interface, may damage other devices connected to the USB interface, and may interfere with communications on the USB interface. Because deviating from the USB standard may disrupt the transfer of data over the USB interface, an external device that connects to a USB interface must adhere to the USB standard.

Returning to FIG. 1, external antenna device 105 is configured to utilize the USB interface to exchange data with the wireless computing device 100. Once USB connector 155 is mated with USB connector 150, the two devices (100 and 105) follow the handshaking protocol set forth in the USB standard in order to exchange data over the USB interface (170 and 175) according to the USB standard. Once USB data communication is established over the USB interface, the wireless computing device 100 may choose to utilize for its wireless data communications either (1) the wireless module 140 and internal antenna 120 or (2) the wireless module 145 and external antenna 125 of the external antenna device 105. To utilize the internal antenna 140, the processor 130 uses wireless module 140 (which may contain wireless transmitters/receivers (e.g., transceivers), amplifiers, mixers, and other well-known RF components for generating and/or receiving RF signals) to wirelessly transmit or receive data over internal antenna 140. Alternatively, the processor 140 may utilize external antenna device 105 to transmit/receive data. To do so, the processor 130 must utilize the USB interface (170 and 175) to send/receive data to/from the external device 105, where processor 135 and wireless module 145 transmits/receives data over external antenna 125.

To transmit, for example, the processor 130 may send data over the USB interface (170 and 175) to processor 135, which may then utilize wireless module 145 (typically containing wireless transmitters/receivers (e.g., transceivers), amplifiers, mixers, and other well-known RF components for generating and/or processing RF signals) to wirelessly transmit the data over external antenna 125. In this type of system, the RF transmission path 160 in the wireless computing device 100 is separate from the RF transmission path 165 in the external antenna device 105. The USB interface (170 and 175) provides no RF transmission path between wireless computing device 100 and external antenna device 105. Instead, the data is sent over the USB interface (170 and 175), and each device (via its respective processor and/or wireless module) must independently modulate/demodulate the data on its own RF transmission path. In this sense, the external antenna device 105 is an active device that must utilize the USB communication protocols of the USB standard in order to use external antenna 125. In such a case, the internal wireless module 140 is not utilized, as the external device 105 becomes the primary wireless module for wireless computing device 100.

Figure 3:
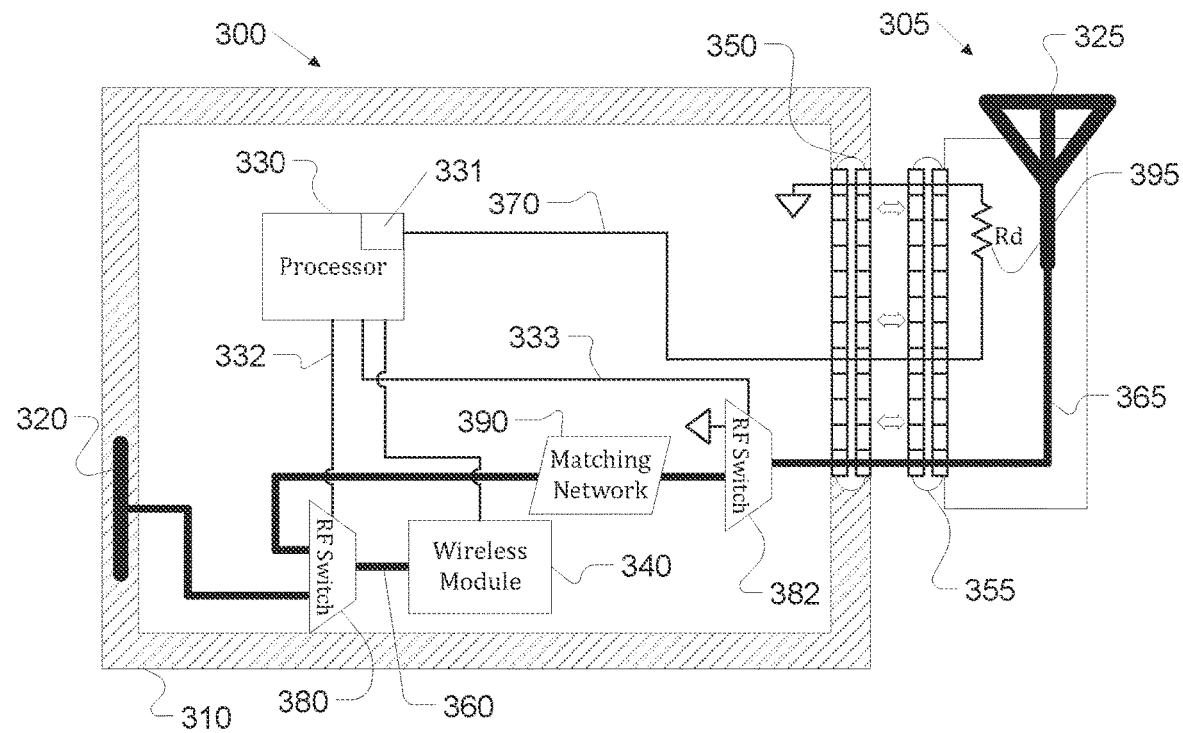
FIG. 3 shows an exemplary wireless computing device and passive external USB antenna device.

FIG. 3 shows an exemplary computing device and external USB antenna according to various aspects. As will be apparent from the description that follows, the exemplary system of FIG. 3 is an improvement over the prior art system discussed with respect to FIG. 1.

Wireless computing device 300 of FIG. 3 is similar in many respects to the wireless computing device 100 discussed above with FIG. 1. As with wireless computing device 100, wireless computing device 300 contains a processor 330, wireless module 340, USB connector 350, and internal antenna 320 within chassis 310. And similar to external antenna device 105 of FIG. 1, external antenna device 305 of FIG. 3 has an external antenna 325 and a USB connector 355 (which may be configured to mate with USB connector 350). However, external device 305 is not required to have a processor and/or wireless module in order for the wireless computing device 300 to utilize the external antenna 325 for wireless transmission/reception. Moreover, external device 305 is not required to follow the USB standard (including the USB enumeration process) in order for the wireless computing device 300 to utilize the external antenna 325 for wireless transmission/reception. In this sense, the external antenna device 305 may be a passive device whose RF transmission path 365 traverses USB connector 355.

As will be explained in further detail below, when external antenna device 305 is connected with wireless communication device 300 (by mating USB connectors 350 and 355), wireless communication device 300 may connect external antenna 325 or internal antenna 320 to the RF transmission path 360 of wireless computing device 300. This may decrease the cost of necessary components on the external antenna device 305, may avoid the time and processing otherwise required for USB enumeration and for transferring data over the USB interface, and may also ensure internal wireless module 340 is utilized in all scenarios whilst improving the wireless transmission/reception performance using external antenna device 305. Though not necessary for wireless computing device 300 to use external antenna 325, one of skill in the art would understand that any number of other functions, features, components, or systems (including the ability to support a USB interface) could be added to external antenna device 305 without detracting from its advantageous passive design.

Figure 4:
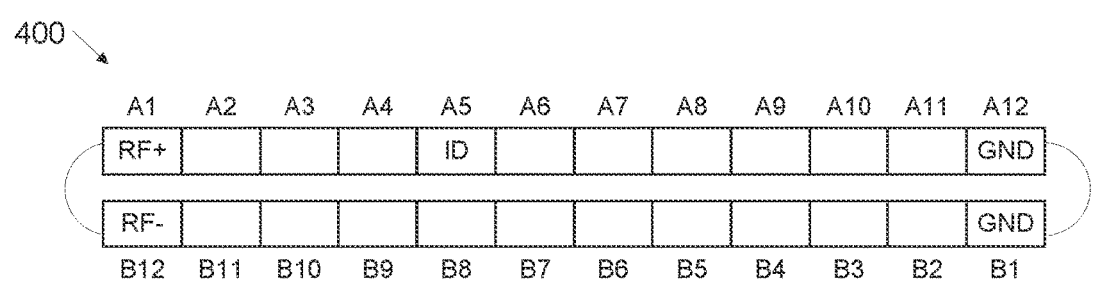
FIG. 4 shows an exemplary non-standard signal pinout of a USB type-C connector.

According to an aspect of the disclosure, as depicted in FIG. 3, the external device 305 may exhibit a passive design, such as by utilizing a standard USB connector (e.g., a USB type C plug, depicted in FIG. 3 as USB connector 355). Importantly, however, external antenna device 305 may deviate from the signaling requirements set forth in the USB standard in that it may use various pins of USB connector 355 for its RF transmission path 365 that is otherwise not allowed by the signaling and communication protocols set forth in the USB standard. For example, as shown in FIG. 4, pins A1 and B12 may be assigned to the positive (RF+) and negative (RF−) side of an RF transmission path, even though the USB standard requires that these pins be assigned to ground (GND) (see FIG. 3.). Although pins A1 and B12 are used here as examples of pins used for the RF transmission path (i.e. RF transmission pins), other pins of the USB connector could be used for the RF transmission path.

Wireless computing device 300 also utilizes a standard USB connector (e.g., a USB type C plug, depicted in FIG. 3 as USB connector 350). Wireless computing device 300 may advantageously support using various pins of its USB connector 350 for an RF transmission path that connects to RF transmission path 360 of the wireless module 340. In addition, when these pins are not used for RF transmissions, wireless computing device 300 may also support USB communications on a USB interface according to the USB standard over USB connector 350. To support both RF transmission and USB communications on USB connector 350, wireless computing device 300 may include an RF switch 382, for example, for selecting between connecting a set of RF transmission pins (thru) to the RF transmission path 360 of wireless communication device 300 or to ground. The RF switch 382 may be set by control line 333 from processor 330, for example, depending on whether the wireless communication device 300 chooses to use the USB connector 350 as an RF transmission path or as a USB interface. RF switch 382 may also be connected to an RF impedance matching network 390 for matching to the impedance of the wireless module 340 or for matching to the impedance of other RF components.

Wireless computing device 300 may also include a second RF switch 380, for example, for selecting between connecting the internal antenna 320 to the RF transmission path 360 or connecting the external antenna 325 to the RF transmission path 360. The RF switch 380 may be set by control line 332 from processor 330, for example, depending on whether the wireless communication device 300 chooses to use internal antenna 320 or the external antenna 325. Wireless computing device 300 may choose, if the external antenna 325 is connected, between connecting the internal antenna to the RF transmission path or connecting the external antenna 325 to the transmission path, based on a preference or performance criteria. The preference or performance criteria may include any number of metrics, including, for example, a user preference, a quality of the transmitted/received communications over the antenna, a received signal strength of the communications, a desired transmit power level for the communications, a battery level of the wireless computing device, or any other type of preference or criteria for selecting the external antenna over the internal antenna or vice versa. As one of skill in the art will appreciate, RF switches 380 and 382 may be operated by independent control lines (as shown in FIG. 3, e.g., 332 and 333) or by the same control line. As one of skill in the art will also appreciate, any number of RF impedance matching networks, RF switches, or other RF components may be part of the RF transmission path.

In addition, wireless computing device 300 may include a detector 331 to detect if an external antenna is connected to the USB connector 350. The detector 331 may be part of or controlled by processor 330, for example, and may have signal line(s) 370 connected to a configuration pin (or a set of configuration pins) of the USB connector 350 that receives identity information indicating whether an external antenna 325 is connected to the USB connector 350. For example, the detector 331 may receive identify information in the form of logic levels or data signals (or a series thereof) on configuration pin(s) of the USB connector 350. Or, the detector 331 may receive identity information by sending out probe signal(s) on signal line(s) 370 and waiting for signal response(s) on configuration pin(s) of USB connector 350 to detect whether an external antenna is connected to USB connector 350.

Figure 5:
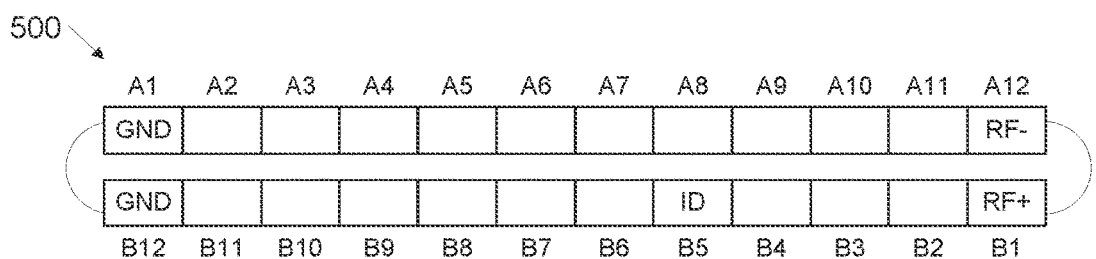
FIG. 5 shows another exemplary non-standard signal pinout of a USB type-C connector.

Alternatively, as depicted in FIG. 4, pin A5 of USB connector 400 is an exemplary configuration pin (ID) that may be connected to signal line(s) 370 for receiving identity information from an external antenna device 305 that may be connected to connector 400. Pins A12 and B1 of USB connector 400 may be connected to ground (GND), while pins A1 (RF+) and B12 (RF−) may be the pins used for the RF transmission path. In the example shown in FIG. 5, pin B5 of USB connector 500 is an exemplary configuration pin (ID) that may be connected to signal line(s) 370 for receiving identity information from an external antenna device 305 that may be connected to connector 500. Pins B12 and A1 of USB connector 400 may be connected to ground (GND), while pins B1 (RF+) and A12 (RF−) may be the pins used for the RF transmission path. Of course, certain other pin arrangements for the RF transmission pins, configuration pin(s), and ground could be used.

Returning to FIG. 3, identity information may be communicated from external antenna device 305 to the detector 331 from an identity module 395. The identity module 395 may be connected to a configuration pin (or configuration pins) of USB connector 355. The identity module 395 may take any number of forms for communicating information to detector 331 over the configuration pin(s) and signal line(s) 370, including, for example, resistors that set logic levels, or signal sources that generate currents, voltages, or signal patterns that may be communicated over the configuration pin(s) and signal line(s) 370. As shown in FIG. 3, the identity module 395 may take the form of a pull-down resistor (Rd)

that sets a logic level (with respect to ground) on a configuration pin of the USB connector 355.

As discussed above, the exemplary external antenna device 305 may be configured to connect with wireless computing device 300 by mating the USB connectors (350 and 355), where USB connector 350 is typically a USB receptacle (e.g., a female connector) and USB connector 355 is typically a USB plug (e.g., a male connector), though other arrangement could be used.

In operation, if the detector 331 of the wireless communication device 300 detects that an external antenna device 305 is connected to USB connector 350, then processor 330 may operate RF switch 382 (e.g., via control line 333) and RF switch 380 (e.g., via control line 332) to connect the RF transmission pins of the USB connector 350 to the RF transmission path 360 of the wireless module 340. As a result, the internal antenna 320 is removed from the RF transmission path 360 and the external antenna 325 is connected to RF transmission path 360. Conversely, if the detector 331 detects that no external antenna device 305 is connected to USB connector 350, then processor 330 may operate RF switch 382 (e.g., via control line 333) and RF switch 380 (e.g., via control line 332) to connect the RF transmission pins of the USB connector 350 to ground and the internal antenna 320 to the RF transmission path of the wireless module 340. As a result, the external antenna 325 is removed from the RF transmission path 360 and the internal antenna 320 is connected to RF transmission path 360.

The following describes various details of a system. It can be understood that the described system can be implemented by means of hardware (e.g. a hard-wired circuit) and/or software (e.g. code segments or an entire application). For example, an application (also referred to as a "program") may be or be provided which has corresponding code segments (e.g. program code). The code segments may be executed on a processor and/or by means of a circuit which has the processor or multiple processors, and any, all, or portions thereof may execute one or more portions of the code segments.

The word "exemplary" is used herein to mean "serving as an example, instance, or illustration." Any example or design described herein as "exemplary" is not necessarily to be construed as preferred or advantageous over other examples or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

The term "processor" as, for example, used herein may be understood as any kind of entity that allows handling of data, signals, etc. These may be handled according to one or more specific functions executed by the processor.

A processor may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), as examples, or any combination thereof. Any other kind of implementation of the respective functions, which will be described below in further detail, may also be understood as a processor or logic circuit. It is understood that any two (or more) of the processors or logic circuits detailed herein may be realized as a single entity with equivalent functionality, and conversely that any single processor or logic circuit detailed herein may be realized as two (or more) separate entities with equivalent functionality. It is understood that one or more of the systems detailed herein may be performed (e.g., realized) by a processor, may by one or more specific functions executed by the processor.

The term "system" detailed herein may be understood as a set of interacting elements, the elements may be, by way of example and not of limitation, one or more physical components (e.g., processors, transmitters and/or receivers) and/or one or more digital components (e.g., code segments, instructions, protocols). Generally, the system may include one or more functions to be operated (also referred to as "operating functions") of which each may be controlled for operating the whole system.

A processor may be configured, e.g., by the code segments (e.g., software), to control the operation of a system (e.g., its operating sequence or the like) and may optionally include a memory to, for example, store code segments that represent the functions or processing that the controller performs. Additionally or alternatively, the memory may store one or more models, criterion, rules, and algorithms, as examples, as detailed herein. It is understood that any two (or more) of the controllers detailed herein may be realized as a single controller with substantially equivalent functionality, and conversely that any single controller detailed herein may be realized as two (or more) separate controller with substantially equivalent functionality. Additionally, references to a "controller" may refer to two or more controllers that collectively form a single controller.

The term "software" refers to any type of executable instruction, including firmware.

Various aspects of this disclosure may utilize or be related to wireless communication technologies. While some examples may refer to specific wireless communication technologies, the examples provided herein may be similarly applied to various other wireless communication technologies, both existing and not yet formulated, particularly in cases where such wireless communication technologies share similar features as disclosed regarding the following examples.

The term "connected" can be understood in the sense of a (e.g. mechanical and/or electrical), e.g. direct or indirect, connection and/or interaction. For example, several elements can be connected together mechanically such that they are physically retained (e.g., a plug connected to a socket) and electrically such that they have an electrically conductive path (e.g., signal paths exist along a communicative chain).

While the above descriptions and connected figures may depict electronic device components as separate elements, skilled persons will appreciate the various possibilities to combine or integrate discrete elements into a single element. Such may include combining two or more circuits from a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A wireless computing device comprising:
   an antenna selector configured to switch a radio frequency (RF) transmission path between an internal antenna and an external antenna;
   a Universal Serial Bus (USB) connector configured to connect to the external antenna, wherein the USB connector is configurable to support signaling on a USB interface according to a USB standard, wherein the USB connector comprises two pins that the USB standard defines as ground pins; and
   a detector configured to detect if the external antenna is connected to the USB connector, wherein the antenna selector is configured to switch the RF transmission path to the external antenna if the detector detects that the external antenna is connected to the USB connector, wherein if the detector detects that the external antenna is connected to the USB connector, the RF transmission path includes the two ground pins, wherein one of the two ground pins is configured to connect to a positive antenna port of the external antenna and another of the two ground pins is configured to connect to a negative antenna port of the external antenna.

2. The wireless computing device of claim 1, wherein if the detector detects that no external antenna is connected to the USB connector, the USB connector is configured to support signaling on the USB interface according to the USB standard.

3. The wireless computing device of claim 1, wherein the antenna selector is configured to switch, based on a preference or performance criteria, between connecting the internal antenna to the RF transmission path and connecting the external antenna to the RF transmission path.

4. The wireless computing device of claim 1, wherein the USB connector comprises a USB type-C receptacle.

5. The wireless computing device of claim 1, wherein the detector is configured to receive identity information via a configuration pin of the USB connector.

6. The wireless computing device of claim 5, wherein the identity information comprises a logic level at the configuration pin.

7. The wireless computing device of claim 6, wherein the logic level is set by a pull-down resistor.

8. The wireless computing device of claim 1, wherein the antenna selector comprises an RF switch configured to connect the two ground pins to ground if the detector detects that no external antenna is connected to the USB connector and further configured to connect the two ground pins to the RF transmission path if the detector detects that the external antenna is connected to the USB connector.

9. The wireless computing device of claim 1, wherein the wireless computing device is configured to perform no enumeration according to USB Revision 3.2 in order to connect the external antenna to the RF transmission path.

10. A USB antenna device comprising:
    an antenna;
    a Universal Serial Bus (USB) connector comprising two pins that a USB standard defines as ground pins; and
    an RF transmission path between the antenna and the two pins of the USB connector, wherein one of the two ground pins connects to a positive antenna port of the antenna and another of the two ground pins connects to a negative antenna port of the antenna.

11. The USB antenna device of claim 10, further comprising an identity module connected to a configuration pin of the USB connector, wherein the identity module is configured to communicate identity information over the configuration pin.

12. The USB antenna device of claim 11, wherein the identity module comprises a pull-down resistor.

13. The USB antenna device of claim 10, wherein the USB standard comprises USB Revision 3.2.

14. A switchable antenna system comprising:
    a wireless computing device comprising an internal antenna, a first radio frequency (RF) transmission path that is switchably connectable to the internal antenna, and a USB receptacle that is configurable to support a USB interface according to a USB standard, wherein the USB receptacle comprises two pins that the USB standard defines as ground pins; and
    an external antenna device comprising an external antenna, a USB plug configured to mate with the USB receptacle, and a second RF transmission path extending from the external antenna to the USB plug, wherein
    if the wireless computing device detects that the external antenna device is connected to the USB receptacle, the wireless computing device connects the first RF transmission path to the second RF transmission path, wherein one of the two ground pins is configured to connect to a positive antenna port of the external antenna device and another of the two ground pins is configured to connect to a negative antenna port of the external antenna device, and
    if the wireless computing device detects that the external antenna device is not connected to the USB receptacle, the wireless computing device connects the internal antenna to the first RF transmission path and the USB receptacle is configured to support the USB interface according to the USB standard.

15. The system of claim 14, wherein the wireless computing device detects that the external antenna device is connected to the USB receptacle by receiving identity information sent from the external antenna device over a configuration pin of the USB plug.

16. The system of claim 14, wherein the external antenna device sends identity information by setting a logic level on the configuration pin with a pull-down resistor.

17. The system of claim 14, wherein the first RF transmission path is connected to the second RF transmission path via two pins of the USB receptacle, and wherein the USB standard requires the two pins to be connected to ground.

18. The system of claim 14, wherein if the wireless computing device detects that the external antenna device is connected to the USB receptacle, the wireless computing device disconnects the internal antenna from the first RF transmission path.

\* \* \* \* \*